United States Patent [19]

Hendrikus

[11] Patent Number: 4,976,663
[45] Date of Patent: Dec. 11, 1990

[54] DRIVING BELT, ELEMENT FOR SUCH DRIVING BELT AS WELL AS A METHOD FOR PRODUCING SUCH ELEMENT

[75] Inventor: Johannes Hendrikus, Berlicum, Netherlands

[73] Assignee: Van Doorne's Transmissie B.V., Tilburg, Netherlands

[21] Appl. No.: 413,359

[22] Filed: Sep. 27, 1989

[30] Foreign Application Priority Data

Oct. 17, 1988 [NL] Netherlands .......................... 8802546

[51] Int. Cl.$^5$ .............................................. F16G 1/24
[52] U.S. Cl. .................................................. 474/242
[58] Field of Search ................ 474/201, 237, 240, 242, 474/244, 245, 265

[56] References Cited

U.S. PATENT DOCUMENTS

| | | | |
|---|---|---|---|
| 4,080,841 | 3/1978 | Vollers | 74/236 |
| 4,386,921 | 6/1983 | Roberts | 474/242 X |
| 4,526,559 | 7/1985 | Smirl | 474/242 X |
| 4,854,919 | 8/1989 | van Lith | 474/25 |

FOREIGN PATENT DOCUMENTS 62996  7/1913  Fed. Rep. of Germany ...... 474/242

Primary Examiner—Thuy M. Bui
Attorney, Agent, or Firm—Pennie & Edmonds

[57] ABSTRACT

Transverse elements (6), suitable for being used in V-shaped pulleys (1,2) of a continuously variable transmission, are provided with endless carriers (7), which due to a transmission ratio dependent misalignment of the pulleys (1, 2), contact the lateral boundary face (16) of the element (6), under circumstances, which causes an excessive wear and shortens the life of the transmission belt with such elements (8).

A solution is being provided to result in elements (8) whose boundary faces (16) are at least partly rounded in the longitudinal direction of the element (8), which can be realized by a sanding operation.

19 Claims, 3 Drawing Sheets

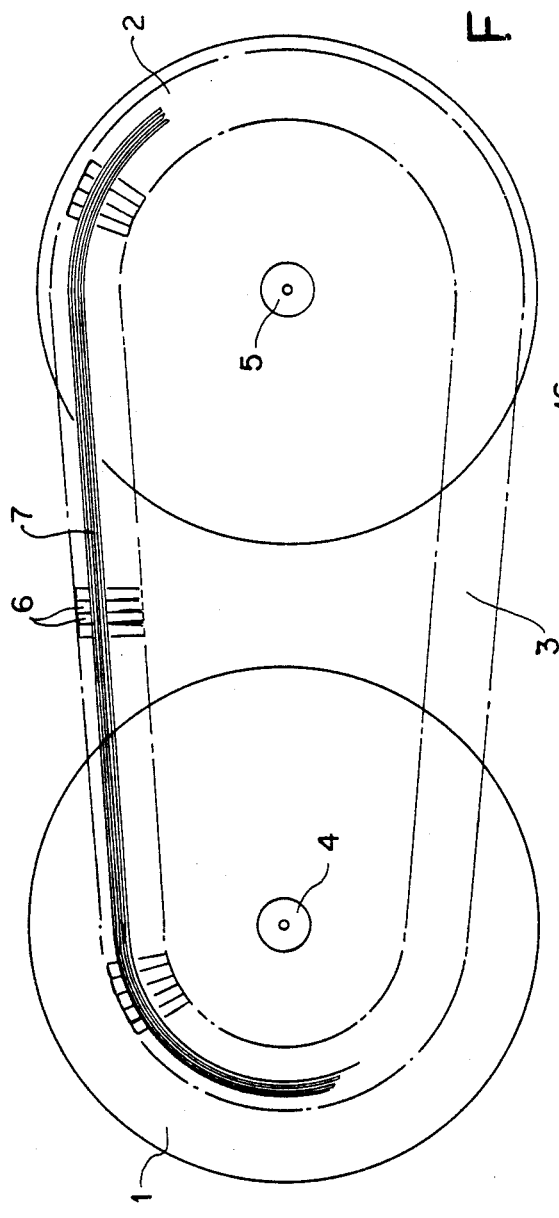
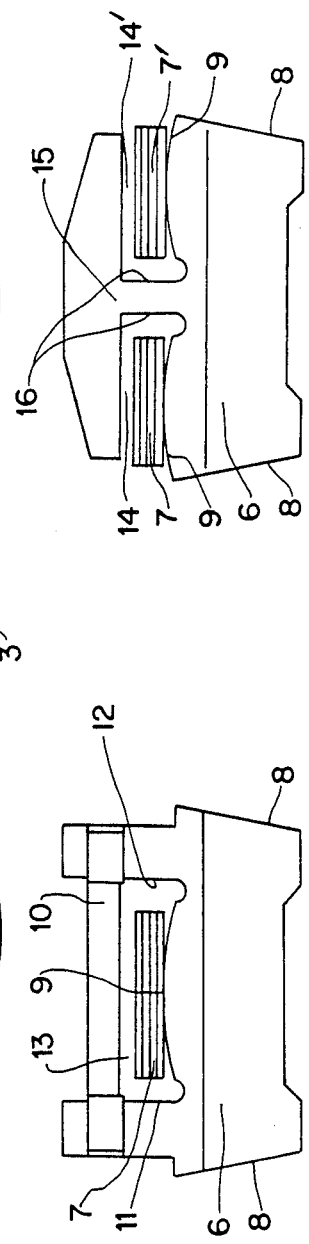

0,663

DRIVING BELT, ELEMENT FOR SUCH DRIVING BELT AS WELL AS A METHOD FOR PRODUCING SUCH ELEMENT

FIELD OF THE INVENTION

The invention relates to a transverse element for a driving belt, suitable for being used on V-shaped pulleys of a continuously variable transmission.

Transverse elements for driving belts used in continuously variable transmissions are known from the U.S. Pat. No. 4,080,841, whereby the abutting face for butting against the inner side of the carrier is convexly curved. As a result, it is to a large extent prevented that the carrier laterally touches the element, and resultant wear and damage due to said touching is considerably reduced, and the life of the driving belt is extended.

It has become apparent that indeed the contact between the carrier and the transverse element is considerably reduced, but such a contact cannot be prevented at all times. This is especially caused by the geometry of the continuously variable transmission in which the driving belt is used. The pulleys of such a continuously variable transmission are aligned for only a limited number of transmission ratios, as is described in detail in U.S. Pat. No. 4,854,919 to Van Lith. As a result the driving belt often runs out of alignment between the pulleys. The result of this is a lateral movement of the transverse elements when the transverse elements move into the pulleys, which movement is not completely followed by the carrier at once, as a result of which in some extreme cases contact between the transverse elements and the carrier is possible. Said contact is undesirable and results in a non-optimal life of the driving belt.

The object of the invention is to limit and thereby overcome the drawbacks of the known transverse elements.

SUMMARY OF THE INVENTION

In order to accomplish that objective the transverse element of the kind described above is according to the invention characterized in that the lateral boundary face is at least partly rounded in the longitudinal direction of the transverse element. Thus, a driving belt is provided with one or more endless carriers on which transverse elements are movably provided. The transverse elements have recesses for accommodating the carriers, each recess bounded by at least one surface for abutting the inner side of the carrier, and by the aforementioned rounded boundary surface for laterally retaining the carrier.

As a result of this construction the transverse elements and the carrier can no longer touch one another in a number of cases, whilst in those cases where there is still contact the nature and the intensity of the contact has been reduced to such an extent that excessive wear or damage cannot occur, as a result of which the life of the driving belt has been considerably improved.

BRIEF DESCRIPTION OF THE DRAWINGS

The invention will be further explained hereafter, with reference to an embodiment and a drawing. In the drawing:

FIG. 1 is a diagrammatic illustration of a driving belt around the pulleys of a continuously variable transmission;

FIG. 2 is an embodiment of a transverse element;

FIG. 3 is a second embodiment of a transverse element;

FIG. 4b is an exploded view of the transverse elements and driving belt shown in FIG. 4a;

DETAILED DESCRIPTION OF THE PREFERRED EMBODIMENTS

Figure 4B:
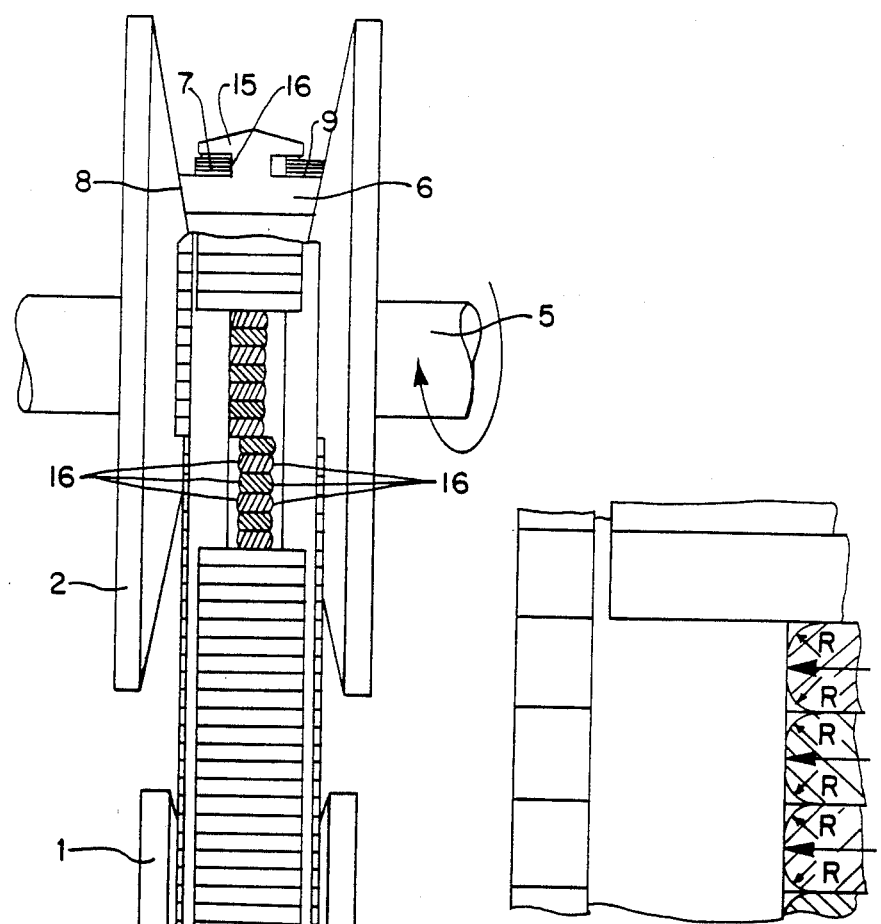

FIG. 1 illustrates two pulleys 1, 2 of a continuously variable transmission. The pulleys 1, 2 are mounted on the shafts 4 and 5 respectively. Around the pulleys 1, 2 there is provided a driving belt 3. The driving belt 3 comprises a large number of transverse elements 6 which are movably provided on one (FIG. 2) or more (FIG. 3) carriers 7. The carrier 7 may comprise a single band but may also consist of one or more band packs. The transverse elements 6 are slightly conical towards the inside, by means of the flanks 8, for co-operation with the conical discs of the pulleys 1, 2.

FIG. 2 illustrates a transverse element 6 for use with a single carrier 7, which carrier 7 may be built up of one or more endless bands. The transverse element 6 comprises a recess 13 with an abutting face 9 for butting against the lower surface of the carrier 7. The carrier 7 is furthermore laterally retained by the boundary faces 11 and 12, respectively, whilst the carrier 7 is retained at its upper surface by a retaining pin 10.

FIG. 3 illustrates a transverse element 6 for use with two carriers 7, 7', which may be accommodated in the recesses 14, 14'. The recesses 14, 14' are again provided with an abutting face for butting against the inner side of the carrier 7 and 7', respectively. The carrier is retained at its upper surface by a cross piece 15. The recess 14 is open at the longitudinal outer side of the transverse element 6 and is bounded at the inner side by a boundary face 16.

The convexly curved faces 9 in the embodiments of both FIG. 2 and FIG. 3 have a centering effect on the carriers 7 butting against said faces, as a result of which the carriers will constantly tend to be positioned above the uppermost point of the convexly formed face 9, and contact with the boundary faces 11, 12 and 16, respectively, is largely prevented. As has become apparent, however, contact is still possible in a numer of extreme cases. As is illustrated in FIG. 4a this is espetially caused by the specific geometry of the continuously variable transmission, whereby the two pulleys are only aligned for a limited number of transmission ratios, and the driving belt often runs out of alignment between between the pulleys. Where the driving belt enters the pulleys, at the location of pulley 2 in FIG. 4b for example, this results in a certain lateral movement of the transverse elements 6 (illustrated with an arrow to the left) which is not completely followed by the carrier 7 at once. The carrier 7 usually does not touch the boundary faces 16 of the transverse elements 6 hereby, but in a number of cases contact appears to be unavoidable.

Figure 4A:
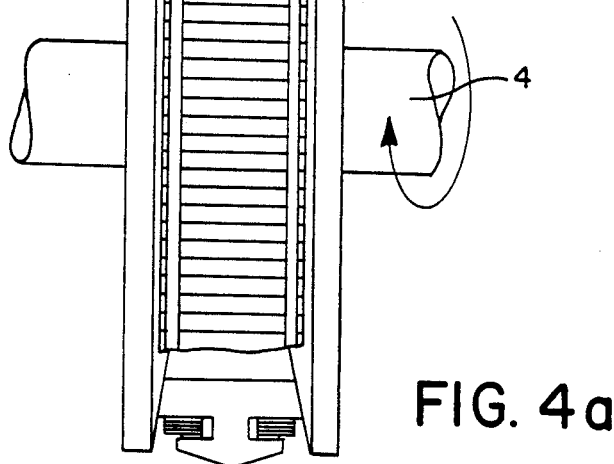
FIG. 4a is a plain view, partly in section, of the driving belt and the pulleys according to FIG. 1.

In order to reduce the nature and the intensity of said contact between the carrier and the boundary faces 16, and in order to even prevent any contact whatsoever in a number of cases, the boundary faces 16 are slightly rounded, as is illustrated in FIG. 4b.

Preferably at least the vertical edges of the boundary faces 16 are rounded, preventing said edges from cutting into the carrier and thereby also preventing damage and wear. A suitable radius of curvature would be larger than or equal to 0.2 mm. Between the rounded edges the remaining part of the boundary face 16 may be straight but also curved. The boundary face 16 may also be completely convex, whereby the radius of curvature is preferably larger than or equal to half the thickness of the transverse element 6, said thickness seen in the longitudinal direction of the driving belt.

Figure 5A:
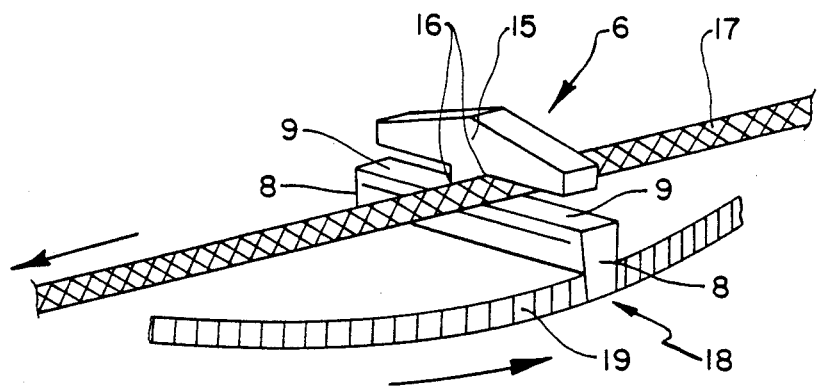
FIG. 5a shows a method according to the invention.

The intended rounding of the boundary face 16 of the transverse element 6 may be provided in a simple manner, e.g. by drawing the transverse element 6 with the boundary faces 16 (FIG. 5a), by means of a tilting movement, along a sanding means, such as a sand ribbon 17. For that purpose one or more transverse elements 6 may be placed e.g. in a slot 18 of a rotating disc 19, whereby the transverse elements 6 are drawn, one by one, with their boundary free 16 along the sand ribbon 17. It will be apparent that e.g. instead of drawing the transverse element the sanding means, casu quo the ribbon, may be drawn tilted, whether or not through an angle, along the transverse element 6.

Figure 5B:
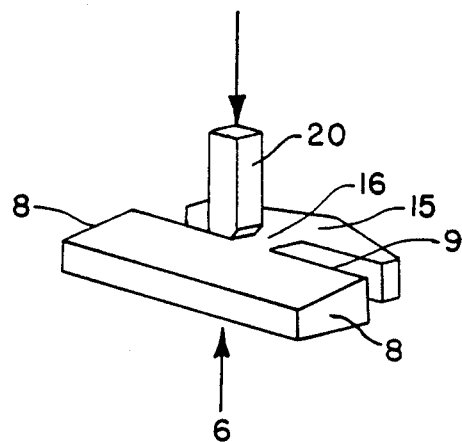
FIG. 5b shows another method according to the invention.
Figure 5C:
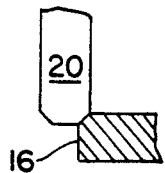
FIG. 5c is an exploded view of the method according to FIG. 5b.

An alternative method for rounding the boundary faces 16 is shown in FIGS. 5b and 5c, and comprises upsetting the boundary faces 16 by means of a press tool 20. (This operation can also very well be combined with other manners of forming the transverse elements 6, such as die-cutting or progressive die-cutting.

It will be apparent, that the invention is not exhaustively illustrated by means of a single embodiment, and that within the framework of the invention various alternative embodiments are conceivable, which are considered to fall within the scope of the invention.

I claim:

1. Transverse element for a driving belt, suitable for being used on V-shaped pulleys of a continuously variable transmission, said driving belt being provided with one or more endless carriers on which the transverse elements are movably provided, whereby the transverse elements are provided with one or more recesses for accommodating the carriers, and whereby each recess is bounded by at least one abutting face for butting against the inner side of the carrier, as well as by at least one boundary face for laterally retaining the carrier, characterized in that the lateral boundary face is at least partly rounded in the longitudinal direction of the transverse element.

2. A transverse element according to claim 1, characterized in that the lateral boundary face has vertical edges, and at least one of the vertical edges is rounded.

3. Transverse element according to claim 2, characterized in that the vertical edge is rounded, with a radius larger than or equal to 0.2 mm.

4. Transverse element according to claim 3, characterized in that the part of the lateral boundary face located between the edges is flat.

5. Transverse element according to claim 3, characterized in that the part of the boundary face located between the edges is convex.

6. Transverse element according to claims 1, 2 or 3 characterized in that the lateral boundary face is convex.

7. Transverse element according to claim 6, characterized in that the lateral boundary face is convex, with a radius of curvature which is larger than or equal to half the thickness of the element.

8. A transverse element for a driving belt, suitable for being used on V-shaped pulleys of a continuously variable transmission, said driving belt being provided with one or more endless carriers on which the transverse elements are movably provided, said transverse elements having one or more recesses for accommodating the carriers, each recess being bounded by at least one abutting face for butting against the lower surface of the carrier, and at least one boundary face for laterally retaining the carrier, wherein the lateral boundary face is at least partly convexly rounded in the longitudinal direction of the carrier.

9. The transverse element according to claim 8, wherein the lateral boundary face has convexly rounded vertical edges.

10. The transverse element according to claim 9, wherein the vertical edges are rounded with a radius of curvature larger than or equal to 0.2 mm.

11. The transverse element according claim 10, wherein the lateral boundary face has a portion located between the vertical edges which is flat.

12. The transverse element according to claim 10, wherein the lateral boundary face has a portion located between the vertical edges which is convex.

13. The transverse element according to claims 8, 9 or 10, characterized in that the lateral boundary face is convex over a full part thereof.

14. The transverse element according to claim 13, characterized in that the lateral boundary face is convex, with a radius of curvature which is larger than or equal to half the thickness of the element.

15. A method for producing a transverse element for a driving belt suitable for use on V-shaped pulleys of continuously variable transmissions, said element having one or more recesses for accommodating one or more endless carriers on which the element is mounted, each said recess bounded by at least one face for abutting the inner side of the carrier and at least one boundary face for laterally retaining the carrier, said lateral boundary face at least partly convexly rounded in the longitudinal direction of the carrier and having convexly rounded vertical edges, comprising the steps of:
producing relative movement between said element and a sanding means; and
contacting said element and said sanding means in a tilting relationship for producing said at least partly convexly rounded lateral boundary face.

16. The method of claim 15, wherein said relative movement is produced by drawing a sand ribbon across the lateral boundary face of said element.

17. The method of claim 15, wherein said relative movement is produced by drawing said lateral boundary face across a sand ribbon.

18. The method of claim 17, wherein said lateral boundary face is drawn across said sand ribbon by mounting said element in a slot in a disc, and rotating said disc.

19. A method for producing a transverse element for a driving belt suitable for use on V-shaped pulleys of continuously variable transmissions, said element having one or more recesses for accommodating one or more endless carriers on which the element is mounted, each said recess bounded by at least one face for abutting the inner side of the carrier and at least one boundary face for laterally retaining the carrier, said lateral boundary face at least partly convexly rounded in the longitudinal direction of the carrier and having convexly rounded vertical edges, comprising the step of upsetting the boundary face of said element with a press tool.

* * * * *

UNITED STATES PATENT AND TRADEMARK OFFICE
CERTIFICATE OF CORRECTION

PATENT NO. : 4,976,663

DATED : December 11, 1990

INVENTOR(S) : Johannes Hendrikus van Lith

It is certified that error appears in the above-identified patent and that said Letters Patent is hereby corrected as shown below:

On title page, line [75], the name of the Inventor should read "Johannes Hendrikus van Lith".

Signed and Sealed this

Twenty-sixth Day of May, 1992

Attest:

DOUGLAS B. COMER

*Attesting Officer*  *Acting Commissioner of Patents and Trademarks*